United States Patent
Popovski et al.

(10) Patent No.: US 8,239,653 B2
(45) Date of Patent: Aug. 7, 2012

(54) ACTIVE-ACTIVE SUPPORT OF VIRTUAL STORAGE MANAGEMENT IN A STORAGE AREA NETWORK ("SAN")

(75) Inventors: Vladimir Popovski, Irvine, CA (US); Ishai Nadler, Kfar Saba (IL); Nelson Nahum, Tustin, CA (US)

(73) Assignee: Netapp, Inc., Sunnyvale, CA (US)

( * ) Notice: Subject to any disclaimer, the term of this patent is extended or adjusted under 35 U.S.C. 154(b) by 577 days.

(21) Appl. No.: 12/428,703

(22) Filed: Apr. 23, 2009

(65) Prior Publication Data

US 2010/0274969 A1  Oct. 28, 2010

(51) Int. Cl.
  *G06F 9/34* (2006.01)
  *G06F 9/26* (2006.01)
  *G06F 13/00* (2006.01)
(52) U.S. Cl. .......... 711/202; 711/150; 711/114
(58) Field of Classification Search .......... 711/114, 711/6, 202–210, 150, 153
See application file for complete search history.

(56) References Cited

U.S. PATENT DOCUMENTS

| | | | |
|---|---|---|---|
| 6,173,374 | B1 | 1/2001 | Heil et al. |
| 6,898,670 | B2 | 5/2005 | Nahum |
| 7,181,578 | B1 * | 2/2007 | Guha et al. .......... 711/154 |
| 7,191,225 | B1 | 3/2007 | Borthakur |
| 2006/0206603 | A1 | 9/2006 | Rajan et al. |
| 2006/0294289 | A1 | 12/2006 | Ashmore |
| 2007/0239944 | A1 * | 10/2007 | Rupanagunta et al. ....... 711/147 |

* cited by examiner

*Primary Examiner* — VanThu Nguyen
*Assistant Examiner* — Khamdan Alrobaie
(74) *Attorney, Agent, or Firm* — Haynes and Boone, LLP (57) ABSTRACT

Methods and apparatuses are provided for active-active support of virtual storage management in a storage area network ("SAN"). When a storage manager (that manages virtual storage volumes) of the SAN receives data to be written to a virtual storage volume from a computer server, the storage manager determines whether the writing request may result in updating a mapping of the virtual storage volume to a storage system. When the writing request does not involve updating the mapping, which happens most of the time, the storage manager simply writes the data to the storage system based on the existing mapping. Otherwise, the storage manager sends an updating request to another storage manager for updating a mapping of the virtual storage volume to a storage volume. Subsequently, the storage manager writes the data to the corresponding storage system based on the mapping that has been updated by the another storage manager.

19 Claims, 8 Drawing Sheets

ACTIVE-ACTIVE SUPPORT OF VIRTUAL STORAGE MANAGEMENT IN A STORAGE AREA NETWORK ("SAN")

BACKGROUND

1. Field of the Invention

The invention relates generally to storage area networks ("SAN") and more specifically relates to active-active support of virtual storage management in a storage area network.

2. Discussion of Related Art

A computer system typically comprises or connects to a storage system for storing data used by the computer system. Especially in large enterprises, storage needs of computer servers have grown exponentially. To meet such storage needs, the industry has provided storage area networks ("SAN") for allowing computer servers to remotely connect to one or more storage systems that comprise a number of disk drives. Typically, a computer server is able to address a piece of data provided by the SAN at a lower data block level rather than at a higher file level.

In some instances, an address that a computer server uses to access a data block of a storage system is an actual address of the physical storage system. By contrast, in other instances an address that a computer server uses to access a virtual storage volume does not exist in a physical storage system. Rather, the virtual storage volume represents an abstraction of one or more physical storage systems that a storage manager presents to the computer server. The storage manager receives the address within the virtual storage volume from the computer, and uses a mapping to map the address to an actual address that does exist in the physical storage system.

It is noted that what is generally referred to as "meta-data" includes the mapping and other relevant information. The storage manager may comprise a computing device including a Fibre Channel appliance, a Redundant Array of Independent Disks ("RAID") controller, or an enhanced Fibre Channel switch, among others. The virtual storage volume is "virtual" because an address of the virtual storage volume does not exist directly in a physical storage system. Rather, each portion of the virtual storage volume is mapped by one or more storage managers to an area of one or more storage systems based on the mapping. A "map fault" occurs in a storage manager if a mapping needs to be updated, for example, if a portion of the virtual storage volume needs to be written to another area of the storage system or another storage system. A computer server is able to access the virtual storage volume by communicating with the one or more storage managers as if the computer server is accessing an actual storage volume.

To improve reliability, storage managers may act in active-passive pairs so that if an active storage manager fails for some reason, certain configuration data relating to the virtual storage volume(s) managed by the active storage manager would have been replicated to a passive storage manager to allow the passive storage manager to become active and continue to provide service to a computer server. However, the computer server typically needs to have special multi-pathing software installed and properly configured in order to communicate with alternate storage managers. Additionally, before the passive storage manager becomes active, the passive storage manager is unable to provide service to the computer server, and is unable to share the work load of the active storage manager.

To allow storage managers to act in an active-active mode, prior techniques and structures have provided an I/O shipping technique. The technique provides that either storage manager is able to provide service to a computer server. However, for a particular virtual storage volume (or an area of the virtual storage volume), only a single preferred storage manager is allowed to write data received from the computer server to a corresponding storage system. Similarly, only the single preferred storage manager is allowed to update the mapping of the virtual storage volume to the corresponding storage system.

If the data to be written is received by a non-preferred storage manager instead of the preferred storage manager, the non-preferred storage manager needs to "ship" the entire data to the preferred storage manager first. Subsequently, the preferred storage manager then actually writes the data to the corresponding storage system and may also update the mapping. Although the non-preferred storage manager may appear no different from the preferred storage manager as seen by the computer server, shipping input/output data in the background among storage managers results in significant overhead and performance degradation.

Alternatively, prior techniques and structures have provided an active-active model supported by shared memory. Under this model, rather than allowing only the single preferred storage manager to update the mapping of the virtual storage volume to the corresponding storage system, multiple storage managers are allowed to update the mapping through a shared memory. However, special and/or complex (hence expensive) hardware needs to be used to implement the shared memory. Additionally, the storage managers generally need to be located in close proximity to each other, for example in order to maintain access speed through the shared memory. Consequently, additional storage managers cannot be readily and/or inexpensively added to the SAN.

Thus it is an ongoing challenge to maintain high performance and reliability of a SAN with active-active storage managers.

SUMMARY

The present invention solves the above and other problems, thereby advancing the state of the useful arts, by providing methods and apparatuses for maintaining high performance and reliability of a SAN with active-active storage managers (that manage virtual storage volumes). In one instance, when a storage manager receives data to be written to a virtual storage volume from a computer server, the storage manager determines whether the writing request may result in updating a mapping of the virtual storage volume to a storage system. When the writing request does not involve updating the mapping, which happens most of the time, the storage manager simply writes the data to the storage system based on the existing mapping. In other instances, the storage manager sends an updating request to another storage manager for updating the mapping. Subsequently, the storage manager writes the data to the corresponding storage system based on the mapping that has been updated by the another storage manager. Advantageously, the amount of information coordinated in the background is drastically reduced because the amount of information exchanged among storage managers relating to the mapping is significantly less than the entire data to be written.

In one aspect hereof, a method is provided for supporting a storage area network ("SAN"). The method comprises receiving, at a storage manager of the SAN, a writing request comprising data to be written to a virtual storage volume. The method also comprises determining whether the writing request may result in updating a mapping of the virtual storage volume to a storage system. Additionally, the method comprises writing, when the writing request does not involve updating the mapping, the data from the storage manager to the storage system based on the mapping already in existence.

Another aspect hereof provides an apparatus for supporting a storage area network ("SAN"), wherein a first storage manager comprises the apparatus. The apparatus comprises a first receiving element adapted for receiving a writing request comprising data to be written to a virtual storage volume. The apparatus also comprises a sending element for sending, from the first storage manager to a second storage manager of the SAN in response to the writing request, an updating request for updating a mapping of the virtual storage volume to a storage system. Additionally, the apparatus comprises a second receiving element for receiving the mapping that has been updated. The apparatus further comprises a writing element for writing, from the first storage manager to the storage system, the data based on the updated mapping.

Yet another aspect hereof provides a system for supporting a storage area network ("SAN"). The system comprises a first storage manager of the SAN and a second storage manager of the SAN. The first storage manager comprises a receiving element for receiving, at the first storage manager of the SAN, a writing request comprising data to be written to a virtual storage volume. The first storage manager also comprises a sending element for sending, from the first storage manager to the second storage manager in response to the writing request, an updating request for updating a mapping of the virtual storage volume to a storage system. The first storage manager further comprises a receiving element for receiving, at the first storage manager, the mapping that has been updated. Additionally, the first storage manager comprises a writing element for writing, from the first storage manager to the storage system, the data based on the updated mapping.

DETAILED DESCRIPTION OF THE DRAWINGS

Figure 1:
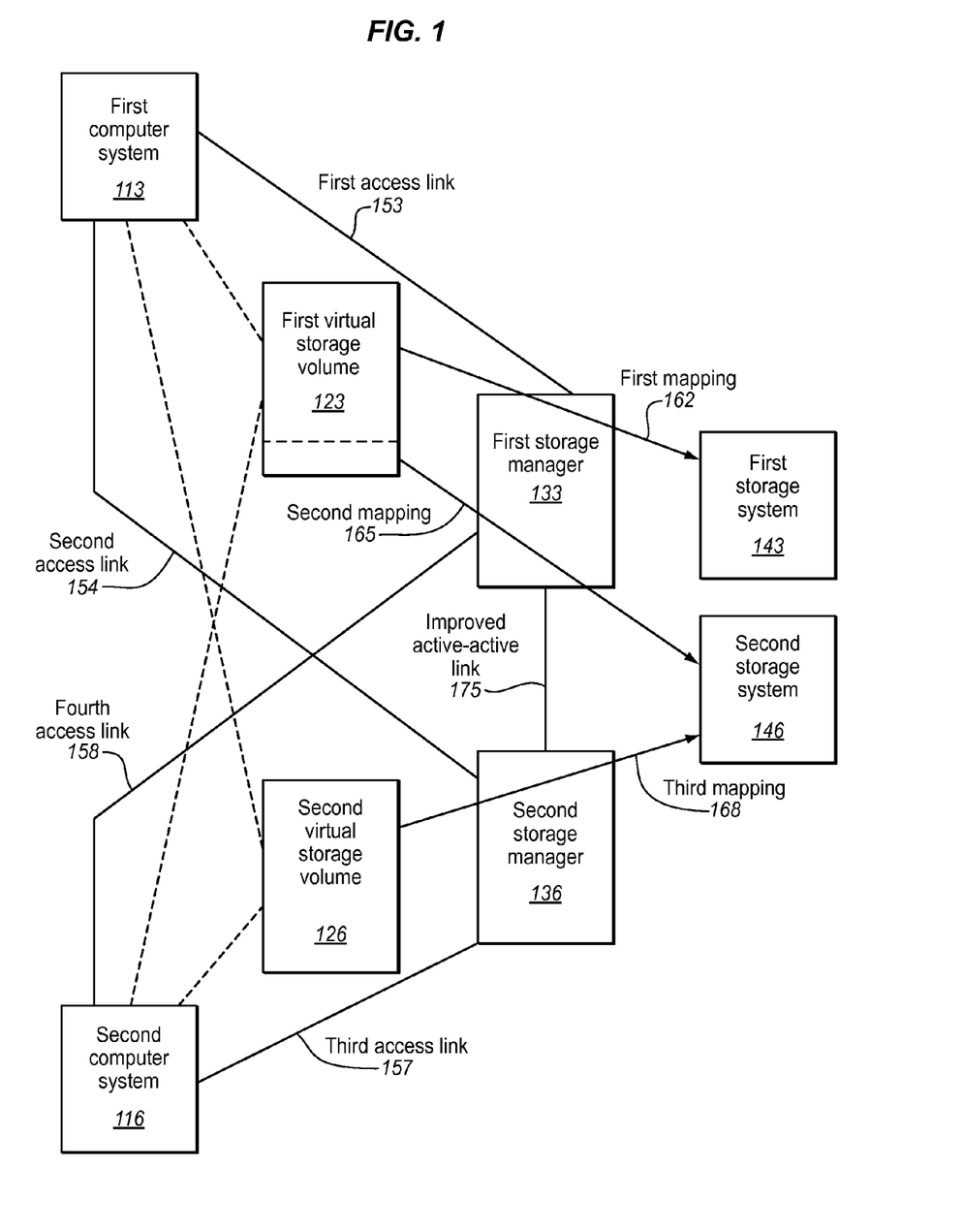
FIG. 1 is a conceptual view of an exemplary storage area network supported with active-active storage managers in accordance with features and aspects hereof.

FIG. 1 is a conceptual view of an exemplary storage area network supported with active-active storage managers (that manage virtual storage volumes) in accordance with features and aspects hereof A first storage manager 133 maintains a first mapping 162 of a first portion of a first virtual storage volume 123 to (an area of) a first storage system 143, and a second mapping 165 of a second portion of the first virtual storage volume 123 to (an area of) a second storage system 146. A second storage manager 136 maintains a third mapping 168 of (portions of) a second virtual storage volume 126 to (another area of) the second storage system 146. More specifically, a storage manager "maintains" a mapping by being responsible to update the mapping, and may be the only storage manager among other storage managers allowed to update the mapping.

The storage managers present virtual storage volumes to computer servers (e.g., 113 and 116), allowing the computer servers to access the virtual storage volumes by communicating with the storage managers as if the computer servers are accessing actual storage volumes. Dotted lines are used in the figure to show the view as seen by the computer servers (113 and 116), while solid lines are used in the figure to show actual access links for communications between the storage managers and the computer servers. More specifically, a first computer system 113 is aware, as represented by the dotted lines, of the first virtual storage volume 123 and the second virtual storage volume 126. Similarly, a second computer system 116 is also aware of the two virtual storage volumes (123 and 126).

The first computer system 113 may accesses the first virtual storage volume 123 by communicating with the first storage manager 133 through a first access link 153. (Alternatively, the first computer system 113 may also access the first virtual storage volume 123 by communicating with the second storage manager 136 through a second access link 154.) Subsequently, the first storage manager 133 may determine, based on the first mapping 162, that a portion of the first virtual storage volume 123 being accessed by the first computer system 113 maps to an area of the first storage system 143. The first storage manager 133 would then access the area of the first storage system 143 without the first computer system 113 having any knowledge of the background mapping. Similarly, the second computer system 116 may accesses the second virtual storage volume 126 by communicating with the second storage manager 136 through a second access link 156. (Alternatively, the second computer system 116 may also access the second virtual storage volume 126 by communicating with the first storage manager 133 through a fourth access link 158) Subsequently, the second storage manager 136 may determine, based on the third mapping 168, that all of the second virtual storage volume 126 is mapped to an area of the second storage system 14.

Indeed, the storage systems (e.g., 143 and 146) in the background are virtualized/abstracted for the computer systems (e.g., 113 and 116) such that the computer systems are not aware of the storage systems. Rather, as noted above, the mappings allow the computer systems to communicate with the storage managers for accessing the virtual storage volumes as if the computer systems are accessing actual storage volumes. Beneficially, portions of the virtual storage volumes (e.g., 123 and 126) may be mapped to different storage systems (e.g., 143 and 146 for resizing the virtual storage volumes) without any impact or change on the computer systems.

As noted above, the first computer system 113 may access the virtual storage volumes (e.g., 123 and 126) through either storage managers (e.g., 133 and 136). Similarly, the second computer system 116 may also access the virtual storage volumes (e.g., 123 and 126) through either storage managers (e.g., 133 and 136). Also as noted above, the third mapping 168 of the second virtual storage volume 126 to the second storage system 146 is maintained by the second storage manager 136 rather than the first storage manager 133.

In an instance, the first computer system 113 might communicate with the first storage manager 133 to request data to be written to the second virtual storage volume 126. The first storage manager 133 does not "ship" the data to the second storage manager 136. Rather, if the third mapping 168 needs to be updated, the first storage manager 133 sends an updating request to the second storage manager 136 through an improved active-active link 175 for updating the third mapping 168. Subsequently, the first storage manager 133 writes the data to the second storage system 146 based on the third mapping 168 that has been updated by the second storage manager 136. The third mapping 168 might have been received over the active-active link 175 in certain instances. In another instance, the first computer system 113 might communicate with the second storage manager 136 also to request data to be written to the second virtual storage volume 126. Because the second storage manager 136 maintains the mapping, the second storage manager 136 is able to write the data to the second storage system 146 based on the third mapping 168 (that might have been updated by the second storage manager 136 itself) without any interaction with any other storage manager.

It is noted that the improved active-active link 175 is beneficially provided between the first storage manager 133 and the second storage manager 136 so that the amount of information coordinated in the background is drastically reduced. In effect, a mapping maintained by a storage manager may be shared with another storage manager by using the improved active-active link 175.

Each of the first storage manager 133 and the second storage manager 136 may comprise a computing device including a Fibre Channel appliance, a Redundant Array of Independent Disks ("RAID") controller, or an enhanced Fibre Channel switch, among others. For example, a Fibre Channel switch may be enhanced to take actions based on commands encapsulated in the Fibre Channel Protocol ("FCP"). Each of the first mapping 162, the second mapping 165, and the third mapping 168 may correspond to entries of one or more tables and/or databases arranged in a wide variety of configurations. The first virtual storage volume 123 and the second virtual storage volume 126 may each be presented (by the storage managers) to a computer system as a logical unit and may be associated with a logical unit number ("LUN"). Each of the first storage system 143 and the second storage system 146 may comprise a disk drive, multiple disk drives, a disk array, one or more tape drives or magneto-optical drives, and/or any other device(s) or system(s) for data storage.

Each of the first access link 153, second access link 154, third access link 157, and fourth access link 158 may comprise a Fibre Channel link of a Fibre Channel network. Other suitable communication media/protocol including InfiniBand, Serial Attached SCSI ("SAS"), Serial Advanced Technology Attachment ("SATA"), Internet SCSI ("iSCSI"), and/or Fibre Channel over Ethernet ("FCoE"), among others, may also be used. The improved active-active link 175 may comprise a Fibre Channel link or an Ethernet link to allow the first storage manager 133 and the second storage manager 136 to communicate using a protocol selected from Fibre Channel network protocol and Internet Protocol ("IP"), among others. The improved active-active link 175 may also be provided using any other suitable communication media/protocol including InfiniBand and/or Serial Attached SCSI ("SAS"), among others.

Figure 2:
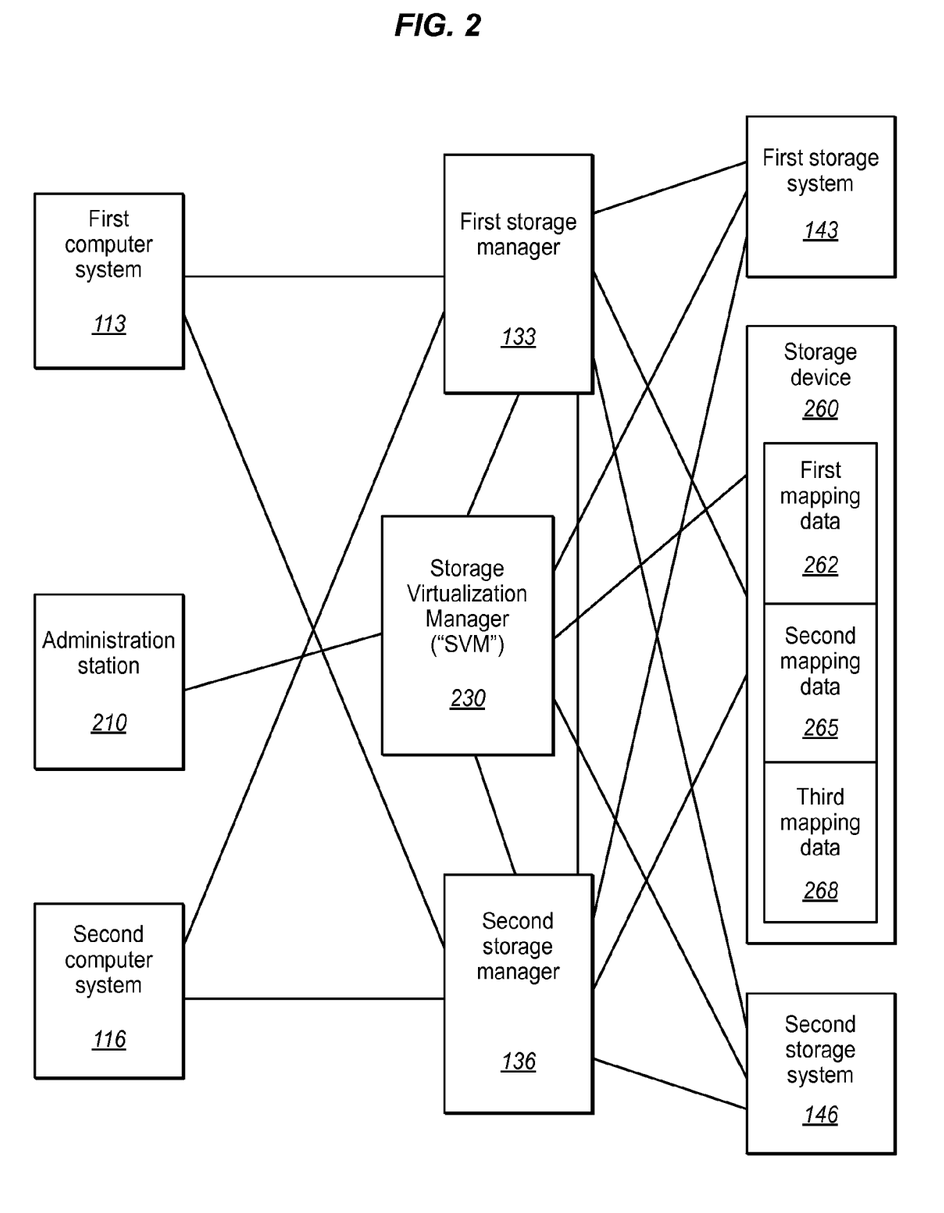
FIG. 2 is a block diagram of an exemplary storage area network supported with active-active storage managers (that manage virtual storage volumes) in accordance with features and aspects hereof.

FIG. 2 is a block diagram of an exemplary storage area network supported with active-active storage managers (that manage virtual storage volumes) in accordance with features and aspects hereof. The first computer system 113 can be in communication with the first storage manager 133 and/or the second storage manager 136. Similarly, the second computer system 116 can be in communication with the first storage manager 133 and/or the second storage manager 136.

The first storage manager 133 is also in communication with both the first storage system 143 and the second storage system 146. Likewise, the second storage manager 136 is also in communication with both the first storage system 143 and the second storage system 146. These communications may be conducted in a Fibre Channel network, among others. Additionally, the first storage manager 133 is in communication with the second storage manager 136. As noted above, the communication may be conducted using a protocol selected from Fibre Channel network protocol and Internet Protocol ("IP"), among others.

An administration station 210 is in communication with a storage virtualization manager ("SVM") 230. The SVM 230 is also in communication with the first storage manager 133 and the second storage manager 136. The administration station 210 allows a user to configure virtual storage volumes that are available to the computer systems and/or configure the mappings of the virtual storage volumes to storage systems. Accordingly, the SVM 230 may also be in communication with the first storage system 143, the second storage system 146, and/or the storage device 260. In essence, the SVM 230 provides centralized management for storage virtualization/distributed storage, for example by managing how storage should be provisioned and/or presented. The SVM 230 may be internal or external to storage managers, and may be a special appliance or software.

The administration station 210 may present a user interface to allow the user to create a virtual storage volume, to designate that a portion of the virtual storage volume should be mapped to an area of a storage system, and specify which storage managers should maintain the mapping (thus defining the "preferred" storage manager for a portion of a virtual storage volume). Configuration input from the user interface is transferred to the SVM 230, which distributes the configuration information to the storage managers. These communications may be conducted using a protocol selected from Fibre Channel network protocol and Internet Protocol ("IP"), or using any other suitable communication media/protocol including InfiniBand and/or Serial Attached SCSI ("SAS"), among others.

Besides the SVM 230, other storage managers or a third party component may also distribute the configuration information. Besides manual configuration by a user, in some instances the configuration information may also be generated automatically based on at least a status of connection with a storage manager. For example, if the connection to the storage manager continues to be healthy (e.g., as evidenced by healthy heart beat messages perhaps sent over the improved active-active link), the storage manager should continue to maintain the mapping. But if the connection to the storage manager is no longer healthy (or if there are more storage managers that indicate their connections to the storage manager are not healthy than storage managers that indicate their connections are healthy), another storage manager should maintain the mapping.

In another instance, the configuration information may be generated automatically based on load balance metrics. For example, if mappings maintained by a storage manager are heavily used/updated, it would be beneficial for another storage manager to maintain some of the mappings to balance the load among the storage managers. In yet another instance, the number of times that each storage manager has determined that a mapping may need to be updated is tracked. The storage manager that most often needs to update a mapping may preferably be the storage manager that maintains the mapping rather than any other storage manager.

The mappings (e.g., the first mapping 162, the second mapping 165, and the third mapping 168 of FIG. 1) each of a virtual storage volume or a portion of a virtual storage volume to an area of a storage system may be maintained either internally or externally at each storage manager. For example, in some instances, each storage manager may store mapping data in internal memory and/or an external storage device. In certain instances, the mapping data may be stored on a storage device 260 that is shared between the storage managers.

The storage device 260 may comprise a disk drive, a solid state drive, an area of a storage system or storage array such that both the first storage manager 133 and the second storage manager 136 may be in communication with the storage device 260. The storage device 260 comprises a first mapping data 262 corresponding to the first mapping 162, a second mapping data 265 corresponding to the second mapping 165, and a third mapping data 268 corresponding to the third mapping 168. As noted above, the mappings may correspond to entries of one or more tables and/or databases arranged in a wide variety of configurations. For example, the mapping data (i.e., data for mapping portions of one or more virtual storage volumes to areas of storage systems) may each be arranged in a single table, in separate tables each corresponding to a virtual storage volume, in a database, or any other suitable structure.

Those of ordinary skill in the art will readily recognize numerous additional and equivalent components and modules within a fully functional storage area network. Such additional and equivalent components are omitted herein for simplicity and brevity of this discussion. Thus, the structures of FIGS. 1 and 2 are intended merely as representatives of exemplary embodiments of features and aspects hereof.

Figure 3:
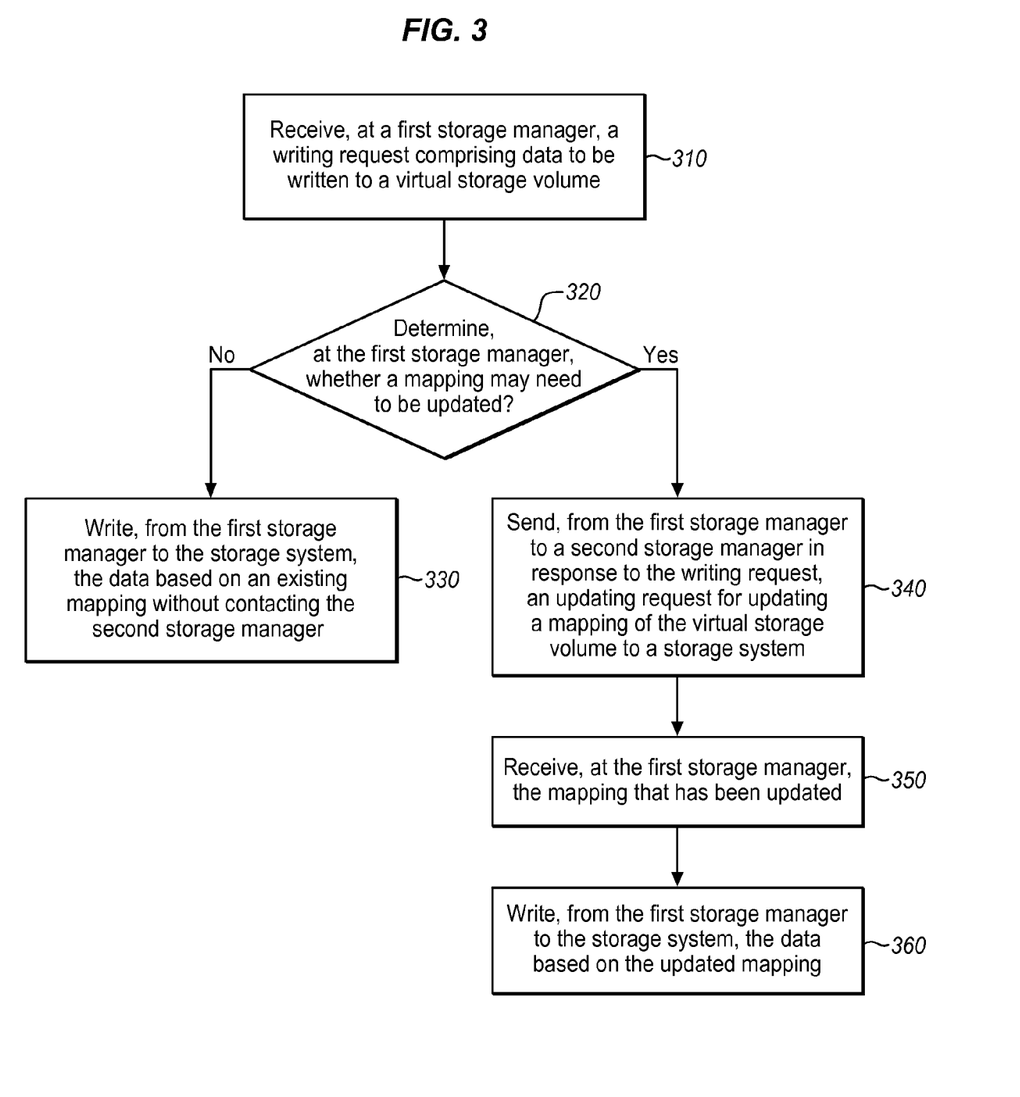
FIG. 3 is a flowchart describing an exemplary method in accordance with features and aspects hereof to support a storage area network with active-active storage managers (that manage virtual storage volumes).

FIG. 3 is a flowchart describing an exemplary method in accordance with features and aspects hereof to support a storage area network with active-active storage managers (that manage virtual storage volumes). At step 310, a first storage manager receives a writing request comprising data to be written to a virtual storage volume. It is noted that the first storage manager may also receive a reading request. In either case the first storage manager then determines whether the first storage manager has a mapping of the virtual storage volume to a storage system. Note that although a mapping may be cached after the mapping is received at a storage manager, the storage manager may receive an invalidating request to invalidate a cached mapping. If the first storage manager does not have the mapping, in one instance the first storage manager may request the mapping from a storage manager that maintains the mapping. In other instances, the first storage manager may access the mapping from a storage device shared with the storage manager that maintains the mapping. For a reading request, once the first storage manager has the mapping, the first storage manager sends the reading request to the storage system based on the mapping.

For a writing request, the first storage manager also determines, at step 320, whether the writing request may result in updating a mapping of the virtual storage volume to a storage system. For example, the first storage manager may check the type of write request. Among other alternatives, a map fault may have been generated at the first storage manager because the existing mapping does not provide enough storage to service the writing request. It is noted that the two determining steps mentioned above may be combined into determining a) a mapping does not exist; or b) for a writing request, that a mapping may need to be updated. Accordingly, the updating request of step 340 as will be discussed may become a request for either updating the mapping or requesting the mapping. However, for clarity the determining steps are discussed separately.

When the writing request does not involve updating the mapping, which happens most of the time, the storage manager simply writes at step 330 the data to the storage system (i.e., the storage system that corresponds to the portion of virtual storage volume being access by the computer system) based on the mapping already in existence. The first storage manager may do so without any interaction with any other storage manager.

Otherwise, at step 340, the first storage manager sends an updating request to a second storage manager in response to the writing request. The updating request is sent for updating a mapping of the virtual storage volume to the storage system (or another storage system). At step 350, the first storage manager receives the mapping that has been updated. At step 360, the first storage manager writes to the storage system the data based on the updated mapping. In effect, the determining step 320 separates writing requests that do not involve updating any mapping from writing requests that may result in updating a mapping.

Figure 4:
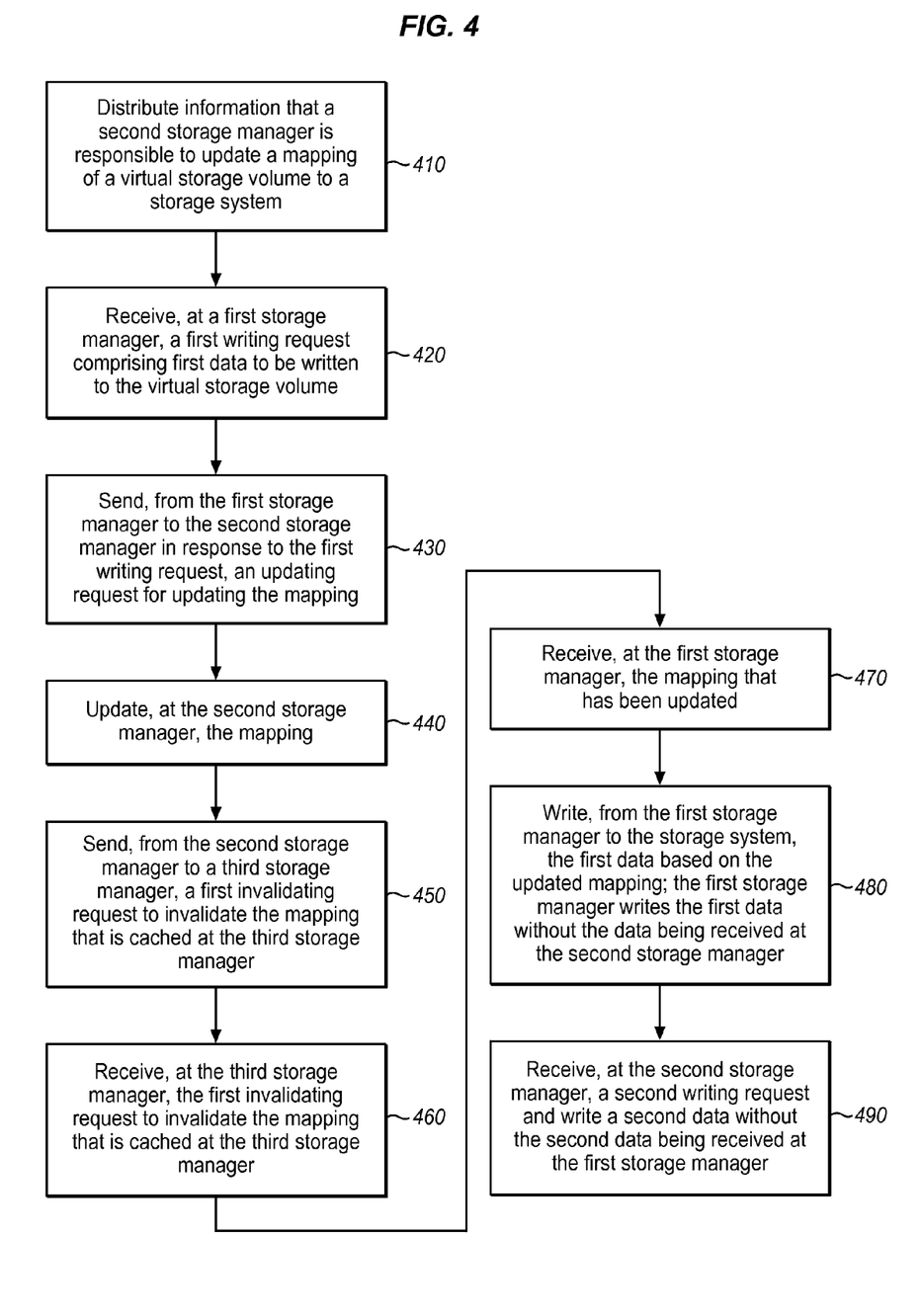
FIG. 4 is a flowchart describing an alternate exemplary method in accordance with features and aspects hereof to support a storage area network with active-active storage managers (that manage virtual storage volumes).

FIG. 4 is a flowchart describing an alternate exemplary method in accordance with features and aspects hereof to support a storage area network with active-active storage managers (that manage virtual storage volumes). At step 410, information that a second storage manager is responsible to update a mapping of a virtual storage volume is distributed to a storage system. As noted above, a storage virtualization manager ("SVM") may be provided to distribution configuration information received from an administration station to storage managers. However, other storage managers or a third party component may also distribute the configuration information. At step 420, a first storage manager receives a first writing request from a computer system. The request comprises first data to be written to the virtual storage volume. At step 430, the first storage manager sends to the second storage manager in response to the first writing request, an updating request for updating the mapping. At step 440, the second storage manager updates the mapping.

At step 450, the second storage manager may send to a third storage manager a first invalidating request to invalidate the mapping that is cached at the third storage manager. At step 460, the third storage manager may receive the first invalidating request to invalidate the mapping that is cached at the third storage manager. It is noted that the first storage manager may invalidate the mapping that is cached at the first storage manger after sending the updating request at step 430. In other instances, the storage managers may not cache any mapping, so that no invalidating request needs to be sent. As can be seen, the method can be readily and easily extended to support three or more storage managers (i.e., an N-way active-active implementation).

At step 470, the first storage manager receives the mapping that has been updated. For example, the first storage manager may receive from the second storage manager an indication that the mapping has been updated. Receiving the mapping will be described in greater detail. At step 480, the first storage manager writes to the storage system the first data based on the updated mapping. Beneficially, the first storage manager writes the first data without the data being received at the second storage manager, thus drastically reducing the amount of information coordinated in the background. At step 490, the second storage manager receives a second writing request and writes a second data without the second data being received at the first storage manager. Details of step 490 will be described in greater detail.

Figure 5:
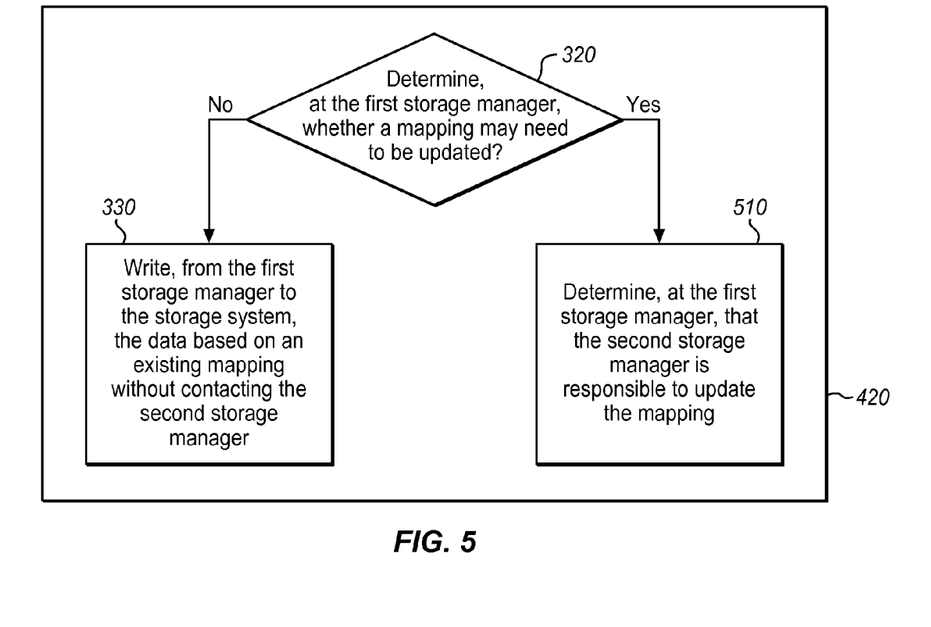
FIG. 5 is a flowchart describing exemplary additional details to receive a writing request.

FIG. 5 is a flowchart describing exemplary additional details to receive a writing request. At step 320, the first storage manager determines whether the mapping needs to be updated in response to receiving the writing request. When the writing request does not involve updating the mapping, which happens most of the time, the first storage manager simply writes at step 330 the data to the storage system based on the mapping already in existence. The first storage manager may do so without any interaction with any other storage manager. Otherwise, the first storage manager determines at step 510 that the second storage manager is responsible to update the mapping. For example, this information may have been distributed by the SVM to the first storage manager.

Figure 6:
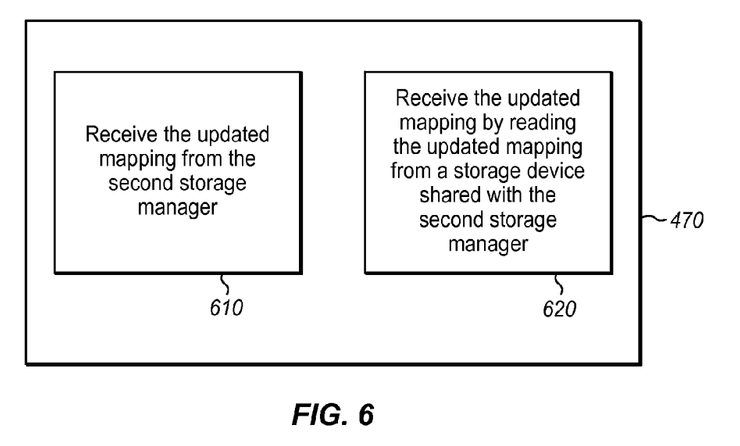
FIG. 6 is a flowchart describing exemplary additional details to receive a mapping.

FIG. 6 is a flowchart describing exemplary additional details to receive a mapping. In some instances, the first storage manager at step 610 receives the updated mapping from the second storage manager. In one alternative, the updated mapping may be received by the first storage manager in the same response message when the second storage manager responds to the updating request from the first storage manager. In another alternative, the updated mapping may be sent in a separate message. In yet another alternative, the updated mapping may be received by the first storage manager after the first storage manager sends a second request (other than the updating request) for the mapping. In other instances, the first storage manager at step 620 receives the updated mapping by reading the updated mapping from a storage device shared with the second storage manager.

Figure 7:
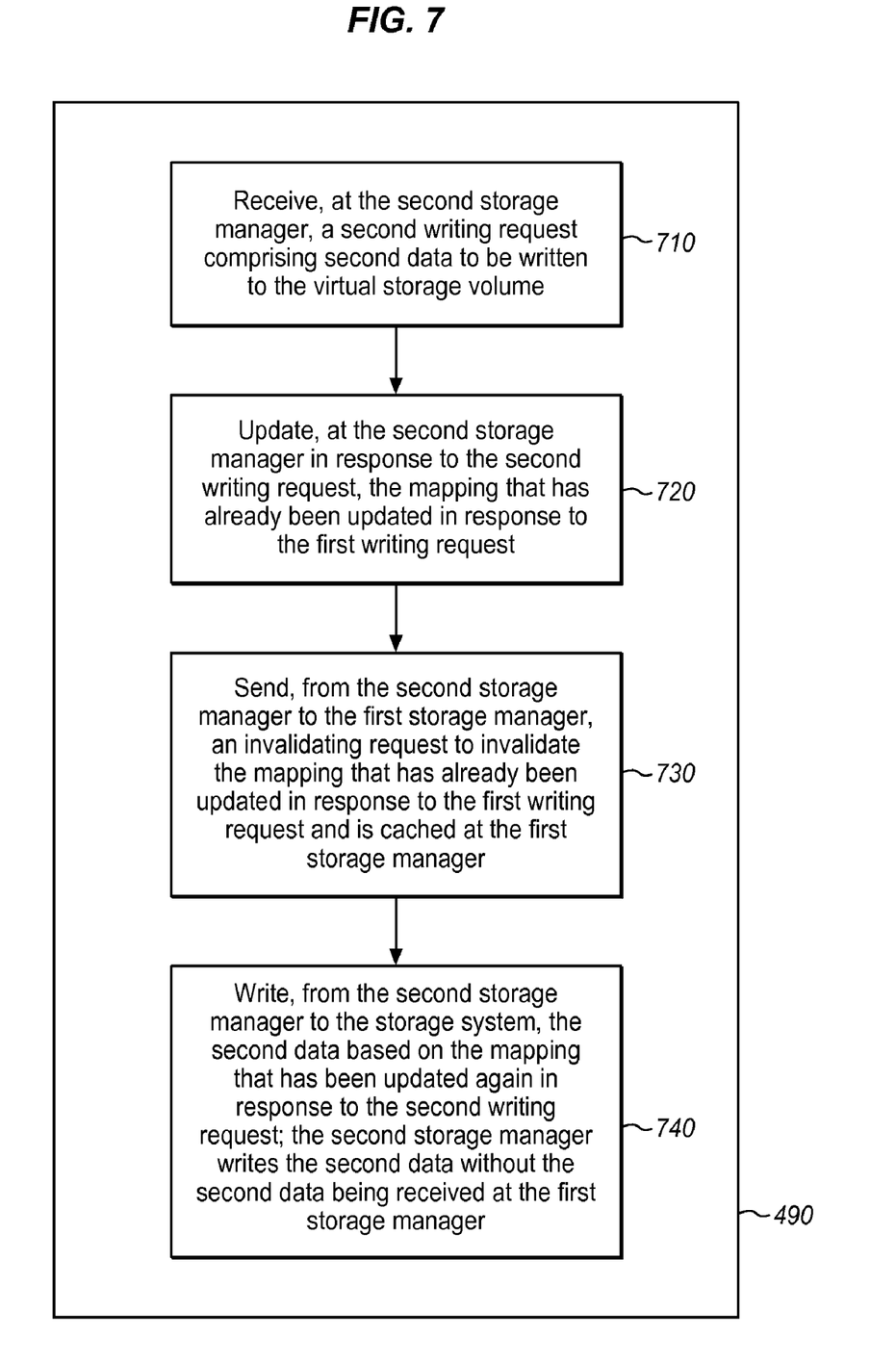
FIG. 7 is a flowchart describing exemplary additional details to receive a second writing request.

FIG. 7 is a flowchart describing exemplary additional details to receive a second writing request at the second storage manager. At step 710, the second storage receives a second writing request from another computer system. The second writing request comprises second data to be written to the virtual storage volume. At step 720, the second storage manager updates, in response to the second writing request, the mapping that has already been updated in response to the first writing request. Similar to the details described above with respect to step 420, the second storage manager may also determine that the mapping needs to be updated and that the second storage manager itself is responsible to update the mapping.

At step 730, the second storage manager may send to the first storage manager an invalidating request to invalidate the mapping that has already been updated in response to the first writing request and is cached at the first storage manager. However, in other instances, the storage managers may not cache any mapping at noted above, and that no invalidating request needs to be sent. At step 740, the second storage manager writes to the storage system the second data based on the mapping that has been updated again in response to the second writing request. It is noted that the second storage manager writes the second data without the second data being received at the first storage manager.

Figure 8:
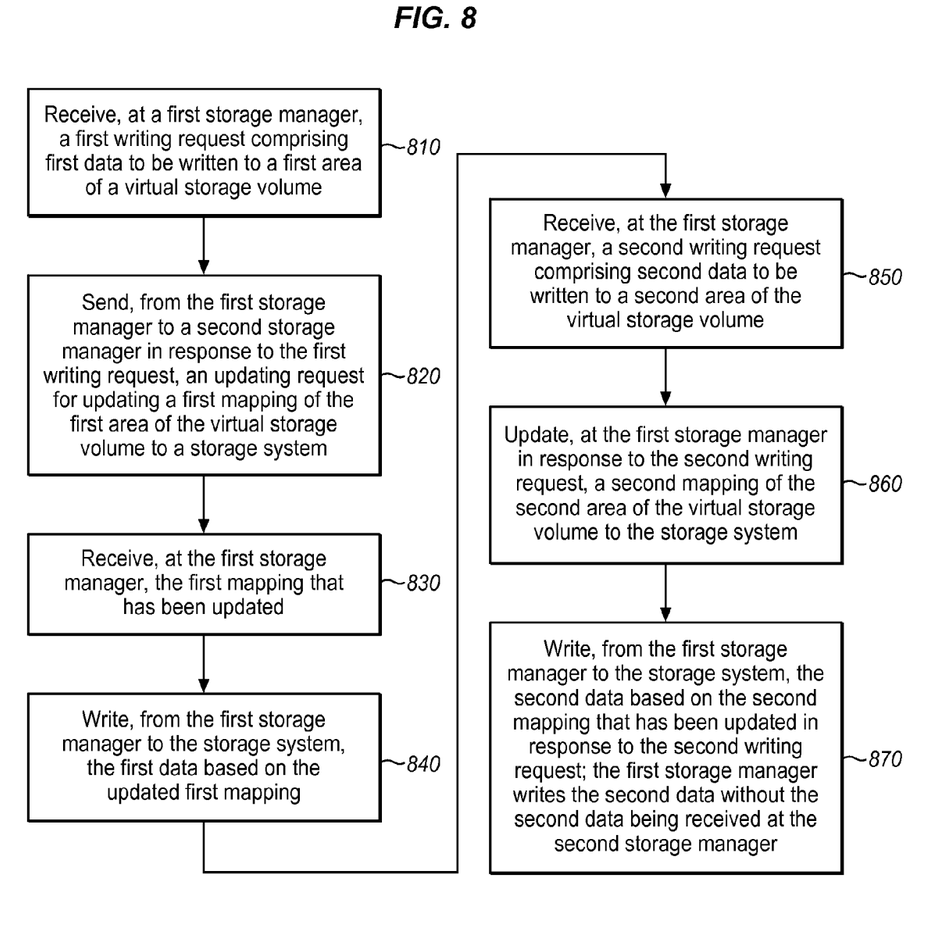
FIG. 8 is a flowchart describing an alternate exemplary method in accordance with features and aspects hereof when a virtual storage volume comprises multiple portions maintained by different storage managers.

FIG. 8 is a flowchart describing an alternate exemplary method in accordance with features and aspects hereof when a virtual storage volume comprises multiple portions maintained by different storage managers. At step 810, a first storage manager receives a first writing request comprising first data to be written to a first portion of a virtual storage volume. Similar to the details described above with respect to step 420, the first storage manager may also determine that the first mapping needs to be updated and that the second storage manager is responsible to update the first mapping. At step 820, the first storage manager sends to a second storage manager in response to the first writing request, an updating request for updating a first mapping of the first portion of the virtual storage volume to a storage system. At step 830, the first storage manager receives the first mapping that has been updated. At step 840, the first storage manager writes to the storage system the first data based on the updated first mapping. It is noted that the first storage manager writes the first data without the first data being received at the second storage manager.

At step 850, the first storage manager receives a second writing request comprising second data to be written to a second portion of the virtual storage volume. Similar to the details described above with respect to step 420, the first storage manager may also determine that the second mapping needs to be updated and that the first storage manager itself is responsible to update the second mapping. At step 860, the first storage manager updates a second mapping of the second portion of the virtual storage volume to the storage system. At step 870, the first storage manager writes to the storage system the second data based on the second mapping that has been updated in response to the second writing request. It is noted that the first storage manager writes the second data without the second data being received at the second storage manager.

Those of ordinary skill in the art will readily recognize numerous additional and equivalent steps that may be performed and/or omitted in the methods of FIGS. 3 through 8. Such additional and equivalent steps are omitted herein merely for brevity and simplicity of this discussion.

Figure 9:
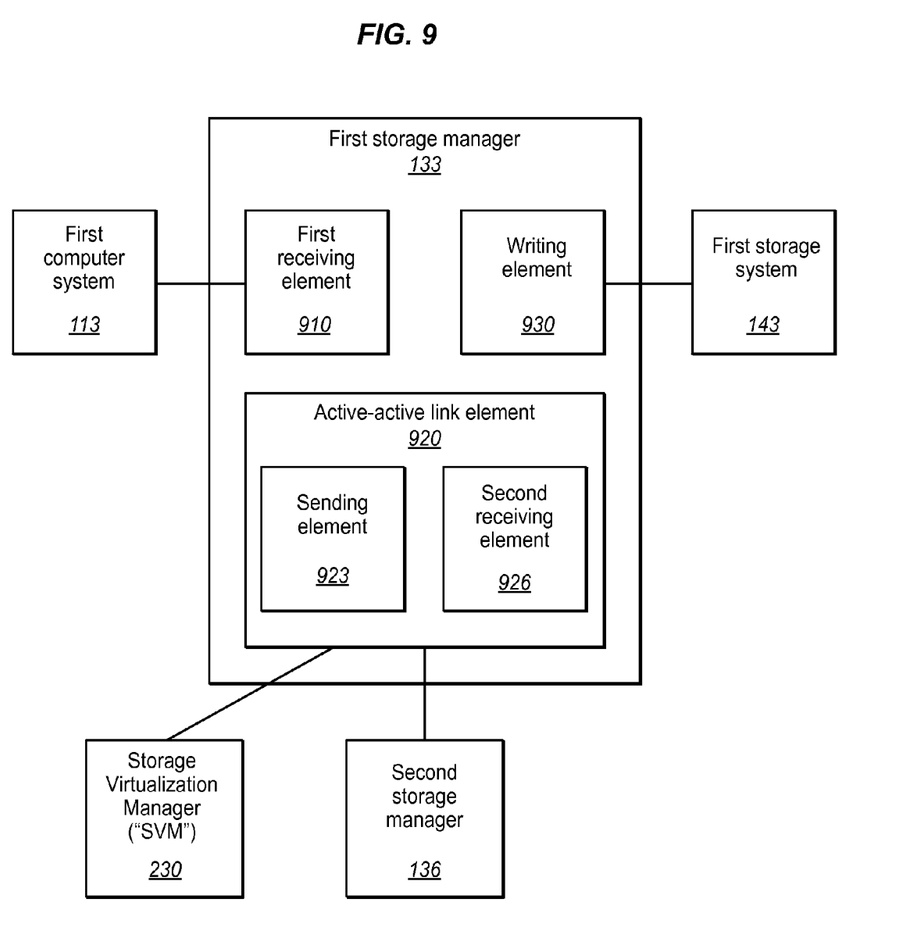
FIG. 9 is a block diagram of an exemplary storage manager (that manages virtual storage volumes) in a storage area network in accordance with features and aspects hereof.

FIG. 9 is a block diagram of an exemplary storage manager (that manages virtual storage volumes) in a storage area network in accordance with features and aspects hereof. The first storage manager 133 comprises a first receiving element 910, a writing element 930, and an active-active link element 920. The first receiving element is adapted for receiving a writing request comprising data to be written to a virtual storage volume from the first computer system 113. The active-active link element 920 comprises a sending element 923 and a second receiving element 926. The active-active link element 920 is in communication with both the SVM 230 and the second storage manager 136. More specifically, the sending element 923 is adapted for sending an updating request to the second storage manager 136 for updating a mapping of the virtual storage volume to the first storage system 143. The second receiving element 926 is adapted for receiving the mapping that has been updated. The writing element 930 is in communication with the first storage system 143 for writing the data based on the updated mapping. Each of these elements may be implemented using customized integrated circuits, programmable logic, and/or implemented in software/firmware.

Those of ordinary skill in the art will readily recognize numerous additional and equivalent components and modules within a fully functional storage manager. Such additional and equivalent components are omitted herein for simplicity and brevity of this discussion. Thus, the structure of FIG. 9 is intended merely as representatives of exemplary embodiments of features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for supporting a storage environment, the storage environment including a first storage manager maintaining a first mapping of a virtual storage volume to a storage system and a second storage manager maintaining a second mapping of the virtual storage volume to the storage system, the method comprising:
receiving from a computer system, at the first storage manager, a first writing request comprising first data to be written to the virtual storage volume;
determining that the first writing request does not result in updating either the first mapping or the second mapping;
writing, in response to determining that the first writing request does not result in updating either the first mapping or the second mapping, the first data from the first storage manager to the storage system based on either the first mapping or the second mapping;
receiving from the computer system, at the first storage manager, a second writing request comprising second data to be written to the virtual storage volume;
determining that the second writing request results in updating the second mapping;
sending, from the first storage manager to the second storage manager in response to the second writing request, an updating request for updating the second mapping of the virtual storage volume to the storage system;
wherein the second storage manager is responsible in updating the second mapping;
receiving, at the first storage manager, an updated second mapping; and
writing, from the first storage manager to the storage system, the second data based on the updated second mapping.

2. The method of claim 1, wherein the first storage manager comprises one of a Fibre Channel appliance, a Redundant Array of Independent Disks ("RAID") controller, and an enhanced Fibre Channel switch.

3. The method of claim 1, wherein:
the updating request is sent using a protocol selected from Fibre Channel network protocol and Internet Protocol ("IP")
the storage system comprises multiple disk drives; and
the first storage manager writes the second data to the storage system without the second data being received at the second storage manager.

4. The method of claim 1, further comprising:
receiving, at a third storage manager, a invalidating request to invalidate the second mapping, wherein the second mapping is cached at the third storage manager.

5. The method of claim 1, wherein the first storage manager receives the updated second mapping from the second storage manager.

6. The method of claim 1, wherein the first storage manager receives the updated second mapping by reading the updated second mapping from a storage device shared with the second storage manager.

7. The method of claim 1, the method further comprising:
receiving, at the second storage manager, a third writing request comprising third data to be written to the virtual storage volume;
updating, at the second storage manager in response to the third writing request, the updated second mapping that has already been updated in response to the first writing request; and
writing, from the second storage manager to the storage system, the third data based on the updated second mapping that has been updated again in response to the third writing request.

8. The method of claim 7, further comprising:
sending, from the second storage manager to the first storage manager, an invalidating request to invalidate the updated second mapping that has been updated again in response to the first writing request and is cached at the first storage manager,
wherein the second storage manage writes the third data to the storage system without the third data being received at the first storage manager.

9. The method of claim 1,
wherein determining that the second writing request results in updating the second mapping is performed by the first storage manager.

10. The method of claim 1, further comprising:
distributing information that the second storage manager is responsible to update the second mapping,
wherein the information is administered by a user through a user interface.

11. The method of claim 1, further comprising:
distributing information that the second storage manager is responsible to update the second mapping,
wherein the information is generated automatically based at least on a status of connection with the second storage manager.

12. The method of claim 1, further comprising:
distributing information that the second storage manager is responsible to update the second mapping,
wherein the information is generated automatically based on load balance metrics.

13. The method of claim 12, wherein:
determining that the second writing request results in updating the second mapping is performed by the first storage manager, and
the load balance metrics comprise a number of times each storage manager has determined that the second mapping needs to be updated.

14. An apparatus for supporting a storage environment, wherein a first storage manager comprises the apparatus, the apparatus comprising:
a first receiving element adapted for receiving, from a computer system, a writing request comprising data to be written to a virtual storage volume;
a mapping element for determining whether the writing request results in updating either a first mapping of the virtual storage volume to a storage system, the first mapping maintained by the first storage manager, or a second mapping of the virtual storage volume to the storage system, the second mapping maintained by a second storage manager;
a sending element for sending, from the first storage manager to the second storage manager in response to the writing request, an updating request for updating the second mapping of the virtual storage volume to the storage system in response to determining that the writing request results in updating the second mapping maintained by the second storage manager;
wherein the second storage manager is responsible in updating the second mapping;

a second receiving element for receiving an updated second mapping; and a writing element for writing, from the first storage manager to the storage system, the data based on any of the first mapping, the second mapping, and the updated second mapping.

15. The apparatus of claim 14, wherein:

the sending element sends the updating request using a protocol selected from Fibre Channel network protocol and Internet Protocol ("IP");

the storage system comprises multiple disk drives; and the writing element writes the data to the storage system without the data being received at the second storage manager.

16. The apparatus of claim 14, further comprising:

a third receiving element for receiving information that the second storage manager is responsible to update the second mapping; and a determining element for determining that the second storage manager is responsible to update the second mapping based on the information.

17. The apparatus of claim 14, wherein the writing element is further adapted for writing the data from the first storage manager to the storage system without the data being received at the second storage manager.

18. A system for supporting a storage environment, the system comprising:

a first storage manager; and a second storage manager;

wherein the first storage manager comprises:

a first receiving element for receiving, from a computer system, a writing request comprising data to be written to a virtual storage volume;

a mapping element for determining whether the writing request results in updating either a first mapping of the virtual storage volume to a storage system, the first mapping maintained by the first storage manager, or a second mapping of the virtual storage volume to the storage system, the second mapping maintained by the second storage manager;

a sending element for sending, to the second storage manager in response to the writing request, an updating request for updating the second mapping of the virtual storage volume to the storage system in response to determining that the writing request results in updating the second mapping maintained by the second storage manager;

wherein the second storage manager is responsible in updating the second mapping;

a second receiving element for receiving an updated second mapping; and a writing element for writing, from the first storage manager to the storage system, the data based on any of the first mapping, the second mapping, or the updated second mapping.

19. The system of claim 18, wherein:

the writing request is received from a computer system through a Fibre Channel network;

the first storage manager comprises one of a Fibre Channel appliance, a Redundant Array of Independent Disks ("RAID") controller, and an enhanced Fibre Channel switch; and the first storage manager writes the data to the storage system without the data being received at the second storage manager.

* * * * *